United States Patent [19]

Christianson et al.

[11] 4,433,946
[45] Feb. 28, 1984

[54] DISCHARGE SYSTEM FOR GRAIN HANDLING APPARATUS

[75] Inventors: Roy O. Christianson; Ted T. Christianson, both of Blomkest, Minn.

[73] Assignee: Christianson Systems, Inc., Blomkest, Minn.

[21] Appl. No.: 285,465

[22] Filed: Jul. 21, 1981

[51] Int. Cl.³ .............................................. B65G 67/20
[52] U.S. Cl. .................................... 406/43; 414/523; 406/109
[58] Field of Search .................. 406/109, 39, 43, 191, 406/157–167; 414/523; 285/283, 184, 185

[56] References Cited

U.S. PATENT DOCUMENTS

| | | | |
|---|---|---|---|
| 2,772,767 | 12/1956 | Seifert | 414/523 X |
| 3,210,127 | 10/1965 | Schaben et al. | 406/109 X |
| 3,345,092 | 10/1967 | Athman et al. | 285/283 |
| 3,721,359 | 3/1973 | Howell et al. | 414/523 |
| 3,834,768 | 9/1974 | Stoltzfus et al. | 406/160 |
| 3,953,077 | 4/1976 | Kulyabko et al. | 406/109 |
| 3,964,512 | 6/1976 | Dumas | 406/191 X |
| 3,995,754 | 12/1976 | De Koning | 414/523 |

*Primary Examiner*—John J. Love
*Assistant Examiner*—L. E. Williams
*Attorney, Agent, or Firm*—Merchant, Gould, Smith, Edell, Welter & Schmidt

[57] ABSTRACT

The present invention is directed to a folding mechanism for the discharge spout system (12) of a pneumatic conveyor (10). The folding mechanism includes a hinge mechanism (55) having an axis (66) which is skewed with respect to a plane perpendicular to the alignment axis (26) of lower and upper tubes (20, 22). Such a hinge mechanism (55) allows the upper portion of upper tube (22) to pass the lower portion of lower tube (20) while upper tube (22) is pivoting from an operational configuration to a transit configuration. An hydraulic cylinder (68) powers the pivotal movement of upper tube (22). An over-center locking mechanism (84) latches lower and upper tubes (20, 22) in the operational configuration.

5 Claims, 8 Drawing Figures

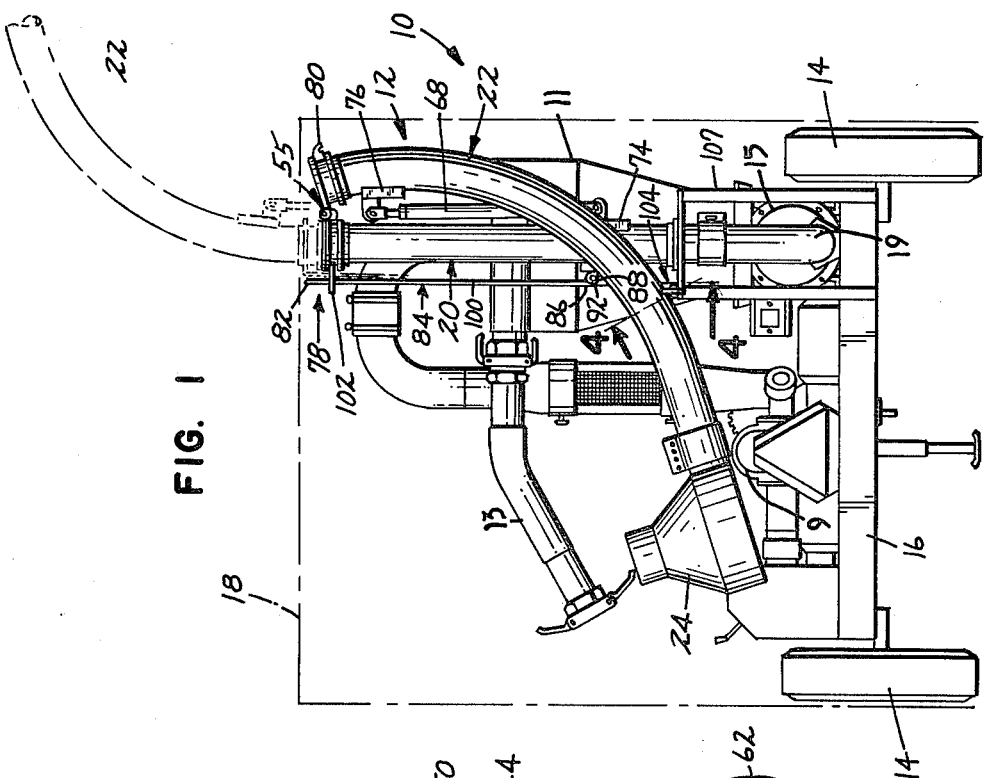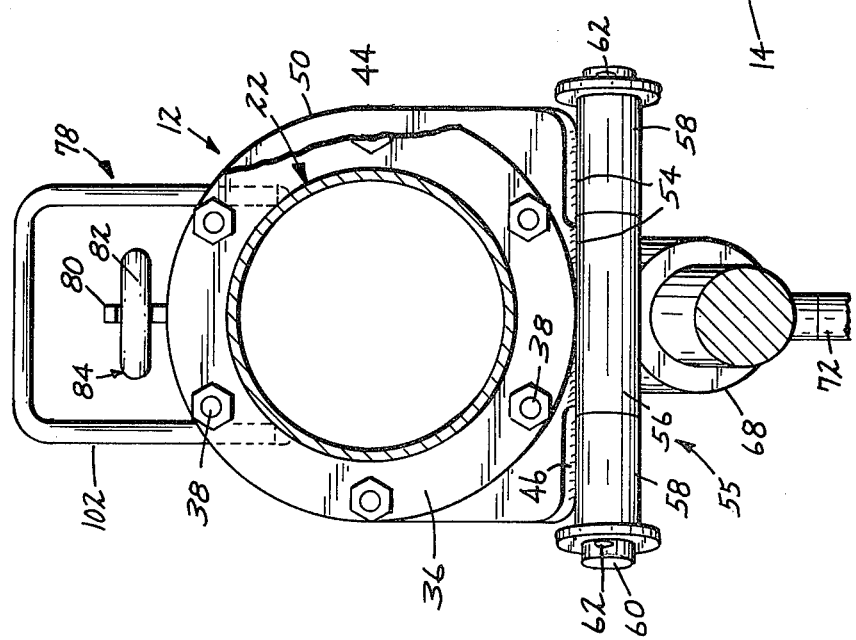

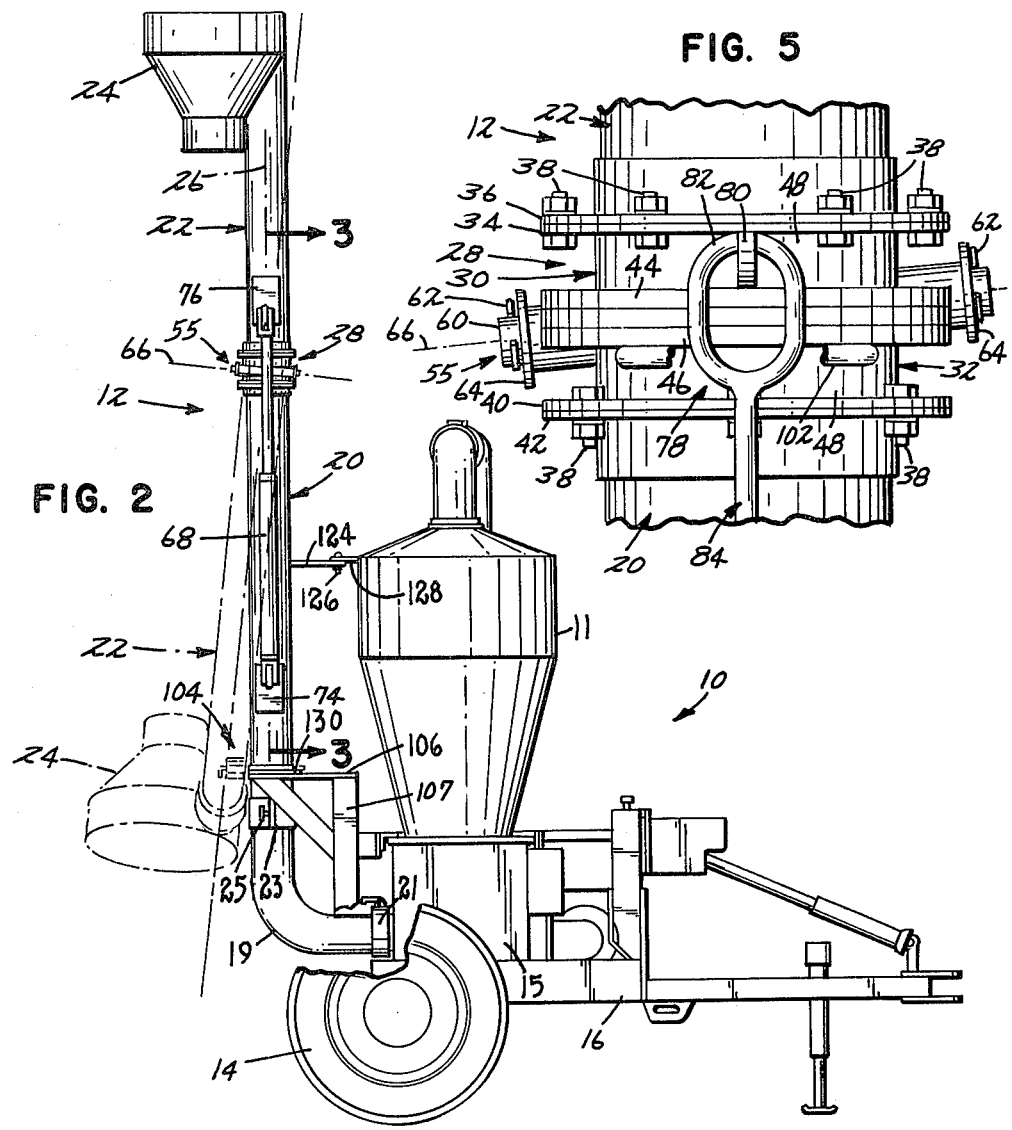
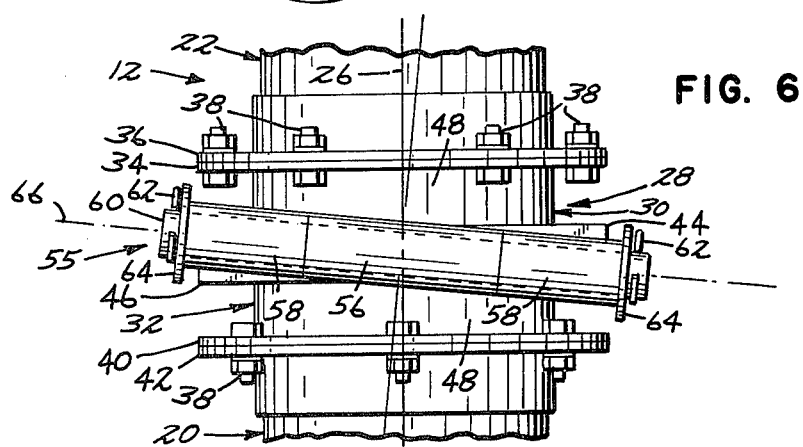

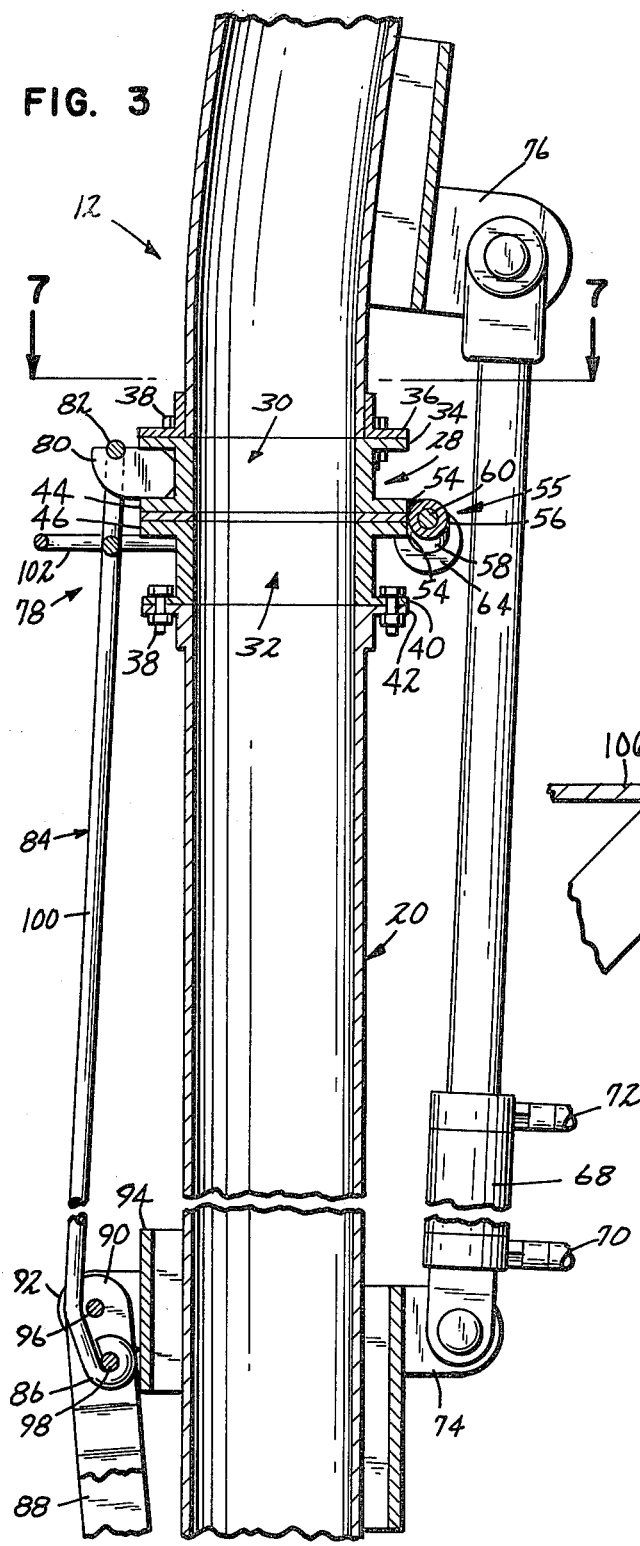

4,433,946

DISCHARGE SYSTEM FOR GRAIN HANDLING APPARATUS

TECHNICAL FIELD

This invention relates generally to apparatus for pneumatically moving or conveying bulk material. More particularly, a folding mechanism is provided for the vertical discharge spout of a bulk material moving or conveying apparatus in order to move the discharge spout from an operational upright configuration into an acceptable folded transit profile. Additionally, a mechanism is provided for disconnecting the vertical discharge spout and rather connecting a horizontal straight discharge for long distance pressure conveying.

BACKGROUND OF THE INVENTION

Pneumatic grain handling equipment commonly makes use of vertically extending tubing to elevate and direct grain into a truck or grain bin. It is often inconvenient, if not impossible, to transport such pneumatic conveying apparatus without removing the vertically extending discharge mechanism. Such removal is inconvenient, difficult and time consuming. Furthermore, such removal is necessary for horizontal straight conveying.

SUMMARY OF THE INVENTION

The present invention is directed to a transportable vehicle having an acceptable transit profile with height and width perpendicular to the direction of travel. The vehicle has a discharge spout extending beyond the transit profile when the spout is in an operational configuration. The vehicle includes an apparatus comprising means for folding the spout from its operational configuration so as to locate the spout within the transit profile.

In a preferred embodiment, a discharge spout is made to include a pair of tubes pivotally connected at a vertical location which is within an acceptable transit profile. The tubes are connected by a mating member which itself is separable into a pair of mating portions. Each mating portion includes one or more sleeves aligned with the sleeves of the other mating portion. A pin passes through the aligned sleeves to form a hinge mechanism. The pivotal axis located along the pin is generally tangential to the tubes and skewed with respect to a plane passing perpendicularly and transversely through the generally vertical axis of the tubes. A powered hydraulic cylinder is connected between the upper and lower tubes to pivot the upper tube about the pin. As a result of the skewed pivotal axis, the uppermost portion of the upper tube folds outwardly away from the lowermost portion of the lower tube. The upper tube thus moves past the lowermost portion of the lower tube thereby advantageously folding the upper tube within the height and width of the transit profile.

In the operational configuration, the tubes comprising the discharge spout are conveniently locked in place with an over-center lever mechanism.

Additionally, an elbow tube is advantageously installed with quick disconnect couplings to provide a quick route for grain from the conveying mechanism to the vertically upright discharge tubes. The elbow may be easily replaced with a horizontal straight tube for connection with other perhaps flexible tubing for long distance pressure conveying.

These advantages and other objects obtained by the use of the present invention may be better understood by reference to the drawings which form a further part of this disclosure and to the accompanying descriptive matter in which there is illustrated and described in more detail a preferred embodiment of the invention.

BRIEF DESCRIPTION OF THE DRAWINGS

FIG. 1 is a rear view of a grain handling apparatus having a foldable discharge spout system in accordance with the present invention;

FIG. 2 is a side view of the apparatus shown in FIG. 1, with phantom lines indicating the folded position of the spout;

FIG. 3 is a cross-sectional view, taken along line 3—3 of FIG. 2, showing the folding mechanism;

FIG. 4 is a cross-sectional view, taken along line 4—4 of FIG. 1, showing retaining mechanism for holding the upper tube in the folded position;

FIG. 5 is a front, close-up view of the hinge mechanism as attached to the connecting member;

FIG. 6 is a rear, close-up view of the apparatus of FIG. 5;

FIG. 7 is a cross-sectional view, taken along line 7—7 of FIG. 3, showing connecting flange and locking mechanism elements; and FIG. 8 is a partial side view similar to FIG. 2 with the elbow tube replaced by a straight tube.

DETAILED DESCRIPTION OF THE INVENTION

Referring now to the drawings wherein like reference numerals designate identical or corresponding parts througout the several views, and more particularly to FIG. 1, a grain handling apparatus, commonly called a pneumatic conveyor, is designated generally by the numeral 10. In general, apparatus 10 has wheels 14 for making a frame 16 easily transportable. The powered conveying mechanism of apparatus 10 is located within the width distance between wheels 14. During transit, discharge spout system 12 may contact trees, wires or may not be structurally sufficient to withstand the torquing motion due to bumps. As a consequence, discharge spout system 12 folds in accordance with the present invention so as to fit within a transit profile 18 shown in phantom lines in FIG. 1 to have a general width and height perpendicular to the direction of travel of apparatus 10.

During operation, grain or other bulk material moves through apparatus 10 under the force provided by a fan or positive displacement blower, as described in a copending U.S. application having Ser. No. 173,864, filed July 30, 1980. Briefly, a fan 9 operates to draw air from a separator chamber 11. At the same time, air is drawn from inlet tube 13 thereby drawing grain as well. Separator chamber 11 serves to separate the grain from the air to allow the grain to bypass fan 9. The drawn air is blown by fan 9 into conveying valve 15 to be remixed with the grain. Grain is then blown from valve 15 into elbow tube 19 and discharge spout system 12. In discharge spout system 12, grain moves substantially vertically upwardly through a generally straight lower tube 20 and an arcuately-shaped, upper tube 22 for discharge from spout 24 (see FIG. 2). Straight portions near the region of connection between lower and upper tubes 20 and 22 are aligned along a common axis 26.

Elbow tube 19 extends outwardly and upwardly from conveying valve 15. Elbow tube 19 is connected by a known cam-lock type coupler 21 at its bottom and a squeeze type compression coupler 23 at its top where it mates with lower vertical tube 20. Elbow tube 19 makes a 90 degree turn in a short radius to provide a quick route for grain to enter vertical lower tube 20, thus increasing grain loading efficiency.

Elbow tube 19 is easily and quickly disconnected by loosening couplers 21 and 23. Compression coupler 23 fastens about a short filler tube (not shown) having a vertical cut therein. The filler tube is the same diameter as vertical lower tube 20 and elbow tube 19. Thus, as threaded rod 25 draws the two sides of compression coupler 23 together, coupler 23 squeezes the filler tube and tightens down on the ends of lower tube 20 and elbow tube 19 to hold them in place relative to each other. Contrarily, when cam-lock coupler 21 is released and threaded rod 25 is loosened, coupler 23 may be slid downwardly onto elbow tube 19, and tube 19 may be rotated and lifted from its operational location.

As shown in FIG. 8, when elbow tube 19 is removed, a straight tube 122 may be installed using cam-lock coupler 21. In this configuration, grain does not enter discharge system 12, but rather may be conveyed horizontally through additional tubing to piles or elsewhere.

As shown in FIG. 2, when elbow tube 19 is removed, discharge spout system 12 is held relative to apparatus 10 by a pair of bracket mechanisms. A plate 124 is welded or otherwise attached to extend from lower tube 20 on the forward side toward apparatus 10. Plate 124 is releaseably attached with a nut and bolt combination 126 to a similar plate 128 extending from a hopper portion of apparatus 10.

Near the bottom of lower tube 20 a ring-shaped flange 130 is attached. Flange 130 is fastened to horizontal platform 106.

Lower and upper tubes 20 and 22 are fastened together with a connecting member 28, as shown in FIGS. 5 and 6. Connecting member 28 includes upper and lower mating portions 30 and 32. Each mating portion 30, 32 has opposite flanged ends with a body 48 therebetween. Upper mating portion 30, for example, has an annular flange 34 which mates with a similar flange 36 extending radially outwardly from the lower end of upper tube 22. Flanges 34 and 36 are fastened with a plurality of nut and bolt combinations 38. Lower mating portion 32 and lower tube 20 have similar mating flanges 40 and 42 also fastened together with a plurality of nut and bolt combinations 38. Upper and lower mating portions 30 and 32 have mating flanges 44 and 46 extending outwardly from the body 48 from the ends opposite flanges 34 and 40 which mate with tubes 22 and 20. The mating surfaces between the several pairs of flanges is ordinarily flat, but may include a gasket material for a more air-tight joint.

Mating flanges 44 and 46 extend radially outwardly to form edges 50 on the side of discharge spout system 12 opposite discharge spout 24. On the other side from that just identified mating flanges 44 and 46 form a substantially square outer perimeter with edges tangent to the circle defined by the diameter of the edges 50. A hinge mechanism 55 is located along the longer portion of the square outer perimeter.

More particularly, a plurality of sleeves are fastened alternately along the long straight edge 54 of mating flanges 44 and 46. At least one sleeve 56 is fastened by welding or otherwise to edge 54 of flange 44 of upper mating portion 30. Similarly, at least one sleeve 58 is fastened to edge 54 of mating flange 46 of lower portion 32. More commonly, a pair of sleeves 58 are spaced to mate with sleeve 56. A pin 60 passes through axially-aligned sleeves 56 and 58 and is held in place by cotter pins 62 at the ends of pin 60. Washers 64 separate the open ends of sleeves 58 from cotter pins 62. The axis 66 passing through the center of pin 60 is non-orthogonal to the axis 26 of the aligned portions of tubes 20 and 22. Axis 66 is, however, generally tangential to tubes 20 and 22. Because axis 66 is in a plane which extends generally transversely through axis 26 but is skewed with respect to a plane perpendicular to axis 26, the pivoting of upper tube 22 about axis 66 moves the upper portion of tube 22 away from the lower portion of tube 20 thereby allowing tubes 20 and 22 to pass one another and effectively fold within transit profile 18. In this fashion, the upper portion of upper tube 22 moves through a plane including the alignment axis 26 of tubes 20 and 22 and being parallel to the pivotal axis 66 of upper tube 22.

It may be noted that it has been found to be advantageous to locate spout 24 outwardly from passing tubes 20 and 22 as shown in phantom lines in FIG. 2. The arcuate shape of upper tube 22 is likewise advantageous in that tube 22 moves past lower tube 20 near its lower end where tube 22 is further spaced from tube 20. Comparatively, a straight tube would pass tube 20 at a higher location and require a much greater skew angle of axis 66.

As shown in FIG. 3, upper tube 22 is pivotally powered about pin 60 by an hydraulic cylinder 68. A pneumatic, electric or other powering mechanism could, of course, be used to equal advantage. Hydraulic cylinder 68 is located on the same side of discharge spout system 12 as spout 24. Hydraulic cylinder 68 has inlet and outlet hoses 70 and 72 for communicating fluid with the remainder of the commonly known hydraulic circuit (not shown). Hydraulic cylinder 68 is attached between brackets 74 and 76, extending outwardly from lower and upper tubes 20 and 22, respectively.

With hydraulic cylinder 68 extended and upper tube 22 in an operational configuration, locking mechanism 78 clamps lower and upper tubes 20 and 22 fixedly in place. Locking mechanism 78 is located on the side of tubes 20 and 22 opposite from hydraulic cylinder 68. Locking mechanism 78 includes a hook member 80 extending outwardly from and fastened by welding or otherwise to the body portin 48 of upper mating portion 30 of connecting member 28. As shown in FIGS. 3 and 5, loop member 84 has an elongated loop located at its upper end 82 for engagement with hook member 80. The lower end 86 is pivotally attached to provide an over-center effect upon operation of lever 88.

Lever 88 has a pair of spaced end portions 90 positioned between ears 92 which extend outwardly from bracket 94. Bracket 94 is attached to lower tube 20. Each end portion 90 of lever 88 has an opening for receiving a pin 96 attached to ears 92. Segments of pin 96 extend through ears 92 to engage end portions 90. Thus, lever 88 may be pivotally moved about pin 96 between a downwardly extending position and an upwardly extending position. It is to be understood, of course, that other structural arrangements known to those skilled in the art may be equally acceptable for pivotally holding lever 88.

The lower portion 86 of loop member 84 is formed to have a circular end or, alternatively, a sleeve is attached. Lower portion 86 receives a pin 98 which is attached between end portions 90 of lever 88. Pin 98 is spaced longitudinally along lever 88 from pin 96. Loop 82 and lower portion 86 of loop member 84 are connected together by a rod 100 which is bent sufficiently to extend around pin 96. Thus, when lever 88 is positioned toward lower tube 20, pin 98 is nearer tube 20 than is pin 96 so that any force directed to pivotably separate lower and upper tubes 20 and 22 acts to tighten hook and loop members 80 and 84.

U-shaped member 102 is fastened to the lower portion 32 of connecting member 28 in order to retain loop member 84 whenever it is not engaging hook member 80.

As shown in FIGS. 2 and 4, when upper tube 22 is folded from its operational configuration to its transit configuration, a retaining mechanism 104 holds it in the transit configuration. The retaining mechanism 104 includes upright bracket 107 attached to frame 16 of pneumatic conveyor 10. Bracket 107 has a horizontal platform 106 to which a retainer plate 112 having an elongated opening 114 therein is attached. A sleeve 110 is attached to a strap 114, both of which are welded or otherwise attached at an appropriate location along upper tube 22. A pin 108 having a handle 116 at one end thereof is positioned through sleeve 110 and opening 114 in retainer plate 112 to hold upper tube 22 in the transit configuration. A washer 118 is ordinarily slipped over the end of pin 108 and retained by a cotter key 120 to prevent pin 108 from vibrating out of engagement with opening 114.

To operate, upper tube 22 is moved from its transit configuration shown in phantom lines in FIG. 2 to its operational configuration shown in solid lines in FIG. 2. Rod 108 is moved from its retaining position by removing cotter key 120 and washer 118 and sliding it from retainer plate 112 and sleeve 110. Pin 108 is ordinarily stored in an opening in horizontal platform 106. The hydraulic circuit is then activated to extend hydraulic cylinder 68 thereby pivoting upper cylinder 22 about pin 60 of hinge mechanism 55. When hydraulic cylinder 68 is fully extended so that flanges 44 and 46 mate, lever 88 is moved upwardly to allow loop 82 to engage hook member 80. Lever 88 is then moved downwardly to a location where pin 98 is inwardly toward lower tube 20 from pin 96.

The indicated procedure is reversed to move upper tube 22 from the operational configuration to the transit configuration within the transit profile.

In this fashion, the discharge spout 24 of a pneumatic conveyor 10 may be moved from a precarious operational position to a transportable position. The skewed axis 66 of hinge mechanism 55 allows upper tube 22 to rotate in a fashion which moves spout 24 and the upper portion of tube 22 away from the lower portion of lower tube 20 and allows the two tubes to pass one another, thus folding into a compact position.

If it is desirable to convey grain along a horizontal distance rather than vertically through discharge spout system 12, then elbow tube 19 is replaced with straight tube 122. More particularly, couplers 21 and 23 are loosened. Elbow tube 19 is removed, and straight tube 122 is installed therefore by tightening cam-lock coupler 21.

Although numerous characteristics and advantages of the present invention, together with details of structure and function, have been described in this disclosure, it is to be understood that the disclosure is illustrative only. Consequently, any changes made, especially in matters of shape, size and arrangement, to the full extent extended by the general meaning of the terms in which the appended claims are expressed, are within the principle of the invention.

What is claimed is:

1. In a transportable vehicle having a transit profile with a height and width perpendicular to the direction of travel, said vehicle having a discharge spout extending beyond said profile when said spout is in an operational configuration, the combination comprising:
    a pair of tubes having proximate first ends, said tubes being axially aligned at said first ends along a first axis to define the operational configuration,
    means for connecting said first ends, said connecting means including means for pivoting one of said tubes with respect to the other between the operational configuration and a transit configuration, said transit configuration including portions of said tubes passing one another, said pivoting means includes a second axis disposed in a first plane extending generally transversely through said first axis but skewed with respect to a second plane which is perpendicular to said first axis, whereby said tubes are compactly positioned for easy transit.

2. In an implement for conveying bulk material, said implement including a system of tubes and means for moving the bulk material through said tubes, said system of tubes including a pair of tubes having first ends axially aligned along a first axis, said pair of tubes extending upwardly to locate an open end at a vertical height, a folding apparatus comprising:
    hinge means for folding one of said pair of tubes with respect to the other, said hinge means having a second axis about which the open end of said aligned tubes may pivot, said second axis being non-perpendicular to said first axis, said open end pivoting through a plane including said first axis and being parallel to said second axis;
    whereby portions of said pair of tubes move past one another as one of said pair of tubes pivots.

3. An apparatus in accordance with claim 2 further including means for locking said hinge means thereby preventing said pair of aligned tubes from inadvertently pivoting with respect to one another.

4. An apparatus for folding a pair of tubes with aligned portions in a bulk material conveyancing implement, said tubes including a straight, lower tube and an arcuately-shaped upper tube, said apparatus comprising:
    means for connecting said upper and lower tubes so as to place said tubes in fluid communication with one another; said connecting means including hinge means for pivoting said upper tube from an operational, first configuration downwardly past said lower tube to a transit second configuration, said hinge means having a first axis extending generally tangentially with respect to the aligned portions of said tubes, the aligned portions of said upper and lower tubes being aligned on a second axis, said first and second axes being non-orthogonal; and
    means for powering said upper tube about said hinge means.

5. In a pneumatic grain moving apparatus, the combination comprising:
    a straight, lower tube;
    an arcuately-shaped, upper tube in fluid communication with said lower tube;

a connecting member having opposite ends attached to said upper and lower tubes, said connecting member being separated into upper and lower portions, said connecting member functioning to align and center a first axis in portions of said upper and lower tubes adjacent said connecting member;

hinge means connected to said upper and lower portions for pivoting said upper tube from an operational, first position downwardly past said lower tube to a transit, second position, said hinge means having a second axis non-perpendicular to said first axis;

means for powering said upper tube about said second axis;

a hook member connected to one of said upper and lower tubes;

a loop member connected to the one of said upper and lower tubes not connected to said hook member; and a pivotable lever connected to said loop member at a location spaced from the lever pivotable axis, said loop member being bent to extend partially around the lever pivotable axis whereby a force directed to pivotably separate said upper and lower tubes tightens said hook and loop members;

whereby in said transit, second position, a portion of said upper tube passes through a plane including said first axis and being parallel to said second axis thereby effectively folding said first and second tubes.

* * * * *